3,439,828
CLOSURE PLUG
Walter Koziol, Russell, Ill., assignor to Charmglow Manufacturing Co., Antioch, Ill., a corporation of Illinois
Filed Mar. 22, 1968, Ser. No. 715,366
Int. Cl. B65d 43/00, 39/16, 41/30
U.S. Cl. 220—24                                      7 Claims

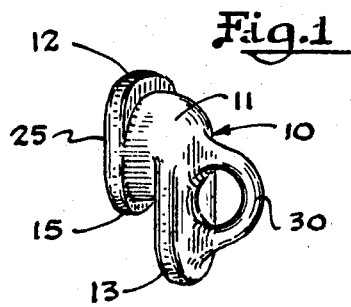
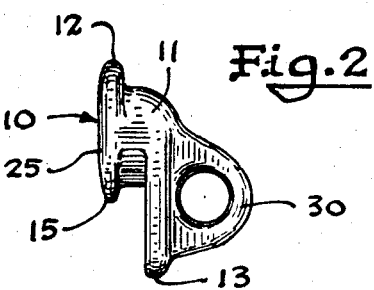
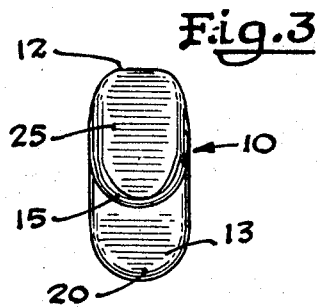
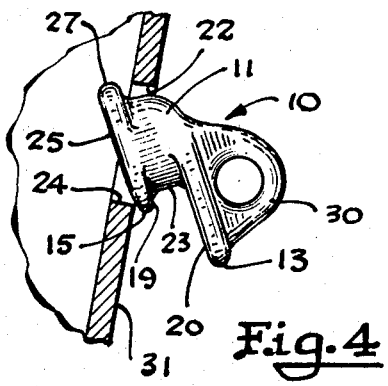
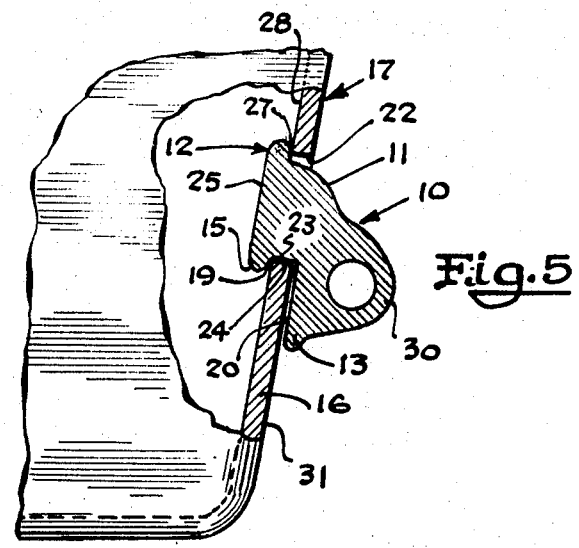
Inventor
Walter Koziol
By Neil E. Hamilton
Attorney

United States Patent Office 3,439,828
Patented Apr. 22, 1969

ABSTRACT OF THE DISCLOSURE

A plug member which can be inserted and retained in a hole by means of a lip insertable in the hole and contacting the inner adjacent wall surface of the hole while a center section of the plug rests by weight of gravity in the hole and on a portion of the wall forming the lower part of the hole. An outer flange extends downwardly from the center section and contacts the outer surface of the wall adjacent the hole, the lip and the flange preventing the plug from falling outwardly when placed in a wall which is pitched outwardly from bottom to top.

Background of the invention

This invention relates to a closure member for an opening and more particularly, to a plug adapted to be inserted into an opening and freely carried therein by means of lips and flanges carried by the plug.

Closure members of the type concerned within this invention are described in U.S. 3,212,665; 3,306,280 and 3,278,066. U.S. 3,278,066 illustrates a closure plate for electrical panelboard wherein a resilient latching and camming means is employed to retain the closure in an opening. U.S. 3,306,280 describes a typical damper plate-type plug 29a for closing a vent hole in a barbecue grill. A resilient and tapered core-type plug is shown in U.S. 3,212,665. The prior art nowhere teaches a plug member which is simple in design and construction and is retained by the wall surfaces surrounding the opening while obviating a hinged plate or resilient type frictional engaging means of the kind requiring close tolerances in fabricating same. Neither is there available a plug member which can be freely carried by an upstanding wall member and employs only a lip and a flange for retention therein.

It is an object of the present invention to provide a novel plug member which has a minimum number of parts yet is effectively held in a passageway. It is another object of this invention to provide a plug member which can be quickly inserted into and removed from an opening. It is still another object of the present invention to provide a plug member which can be manufactured without retaining close tolerances. It is yet another object of this invention to provide a plug member which takes advantage of its weight in being retained in an opening.

Summary of the invention

The foregoing objects are accomplished and the shortcomings of the prior art are overcome by the present plug member which is comprised of a center section substantially filling a hole in a wall into which it is inserted. A lip extends outwardly from the center section in one direction and a flange is spaced from the lip and extetnds outwardly from the center section and in a direction opposite to the direction of the lip. The lip is constructed and arranged to engage an inner portion of the wall when the center section seats in the hole and the flange is disposed outwardly of the hole and adapted to engage an outer portion of the wall.

Brief description of drawings

A better understanding of the present plug member will be accomplished by reference to the drawing wherein:
FIGURE 1 is a perspective view of the vent plug.
FIGURE 2 is a view in side elevation of the plug member.
FIGURE 3 is an end view of the plug shown in FIGURES 1 and 2.
FIGURE 4 is a side elevational view of the plug partially inserted into a hole in a partial wall section.
FIGURE 5 is a view in cross-section of the plug as it rests in a hole in a broken-away portion of a container wall such as a barbecue unit.

Description of the preferred embodiment

Proceeding to a detailed description of the present invention the plug member 10 is comprised of a rounded center section 11 from which extends in one direction a lip member 12 and a flange member 13 in the opposite direction and spaced therefrom. A second lip 15 projects from the end of center section 11 and opposite to lip 12 in a coplanar manner. Lip 15 and flange 13 are spaced apart so that a wall portion 16 of a container such as the base of a barbecue unit 17 is accommodated between the inner adjacent surfaces 19 and 20 of lip 15 and flange 13 respectively. Center section 11 is rounded in an elliptical manner to fit in round hole 22 with the bottom portion 23 of center section 11 seated on a section 24 of wall 16 forming hole 22. It will be noted that lips 12 and 15 together form an end wall 25 on center section 11. End wall 25 as is center section 11 are constructed with a width slightly less than the width of opening 22 so that center section 11 can be seated in hole 22 with portion 23 resting therein.

Referring specifically to FIGURE 5 it will be seen that plug member 10 is constructed and arranged with lip 12 extending a sufficient distance so that the inner face portion 27 contacts an adjacent portion of the inner surface 28 of wall 16 when bottom portion 23 of center section 11 rests on bottom section 24 of hole 22. Contact between face portion 27 and surface 28 is maintained by wall 16 being angled outwardly from the base. This also causes the inner surface 20 of flange 13 to tend to come into contact with the outer surface 31 of wall 16. To aid in the manipulation of plug member 10 into and out of hole 22 a handle projection 30 is mounted to the outside of plug member 10 and on flange 13.

Operation

A better understanding of the advantages of plug member 10 will be had by a description of its operation. Handle 30 is grasped between the thumb and forefinger and inserted into hole 22 so that end wall 25 is at a slight angle from a vertical position to allow lip 12 to clear adjacent surfaces of wall 16. This is the position of plug member 10 as shown in FIGURE 4. The side surfaces of plug 10 will clear through hole 22 because, as previously stated, they are dimensioned slightly less than the width or diameter of hole 22 and center section 11 is dimensioned in height less than hole 22 to permit the insertion of lips 12 and 15 with lip 15 dimensioned to clear wall surface 24 before contact by the upper surface of center section 11 and the adjacent portion of the wall forming hole 22. Once lip 12 is to the inside of wall 16, plug 10 is moved upwardly and flange 13 pivoted toward wall 16 to permit lip 15 to clear the lower wall section 24. In this position, the plug 10 is permitted to drop downwardly by it own weight whereupon it will assume the position shown in FIGURE 5 and effectively close hole 22. To remove plug 10 from hole 22, the previously described steps are merely reversed.

Plug member 10 is illustrated for use in a round hole. However, it can be constructed in practically any geometric configuration whether rectangular, oval, triangular or other polygonal shapes to fit within the desired hole configurations.

The preferred material for plug 10 is aluminum. However, any rigid or semirigid material such as other metals and resinous plastics can be used with the requirement that it be nonflammable if used in conjunction with a fire holding container such as barbecue base 17.

It will thus be seen that through the present invention there is now provided a plug which can be inserted and freely carried in a hole without moving parts, such as hinges, yet has a minimum number of parts. The plug can be quickly inserted in and removed from a hole without requiring close tolerances of the parts comprising the plug. No special molds need be designed to manufacture the plug nor any special tooling. The plug is inexpensive to manufacture yet highly functional.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A plug member insertable and freely carried in a hole for closing same in a wall section comprising a center section for seating in said hole, a lip extending outwardly from said center section and in one direction, a flange spaced from and extending outwardly from said center section and in a direction opposite to said one direction, said lip constructed and arranged to engage an inner portion of said wall when said center section seats in said hole and said flange is disposed outwardly of said hole and adapted to engage an outer portion of said wall.

2. The plug member as defined in claim 1 wherein said flange extends a greater distance from said center section than said lip.

3. The plug member as defined in claim 1 further including a second lip extending from said center section and in the same plane as said lip.

4. The plug member as defined in claim 3 wherein said lip extends from said center section a greater distance than said second lip.

5. The plug member as defined in claim 2 further including a handle projection mounted on said flange and being substantially coextensive therewith.

6. The plug member as defined in claim 1 wherein said plug is constructed and arranged to engage a round hole and is substantially elliptical in cross-section.

7. The plug member as defined in claim 1 wherein said plug member is molded in one piece in cast aluminum.

References Cited

UNITED STATES PATENTS

D. 3,278,066   10/1966   George et al. _____ 220—24.3

GEORGE T. HALL, Primary Examiner.